Figures 1, 3:
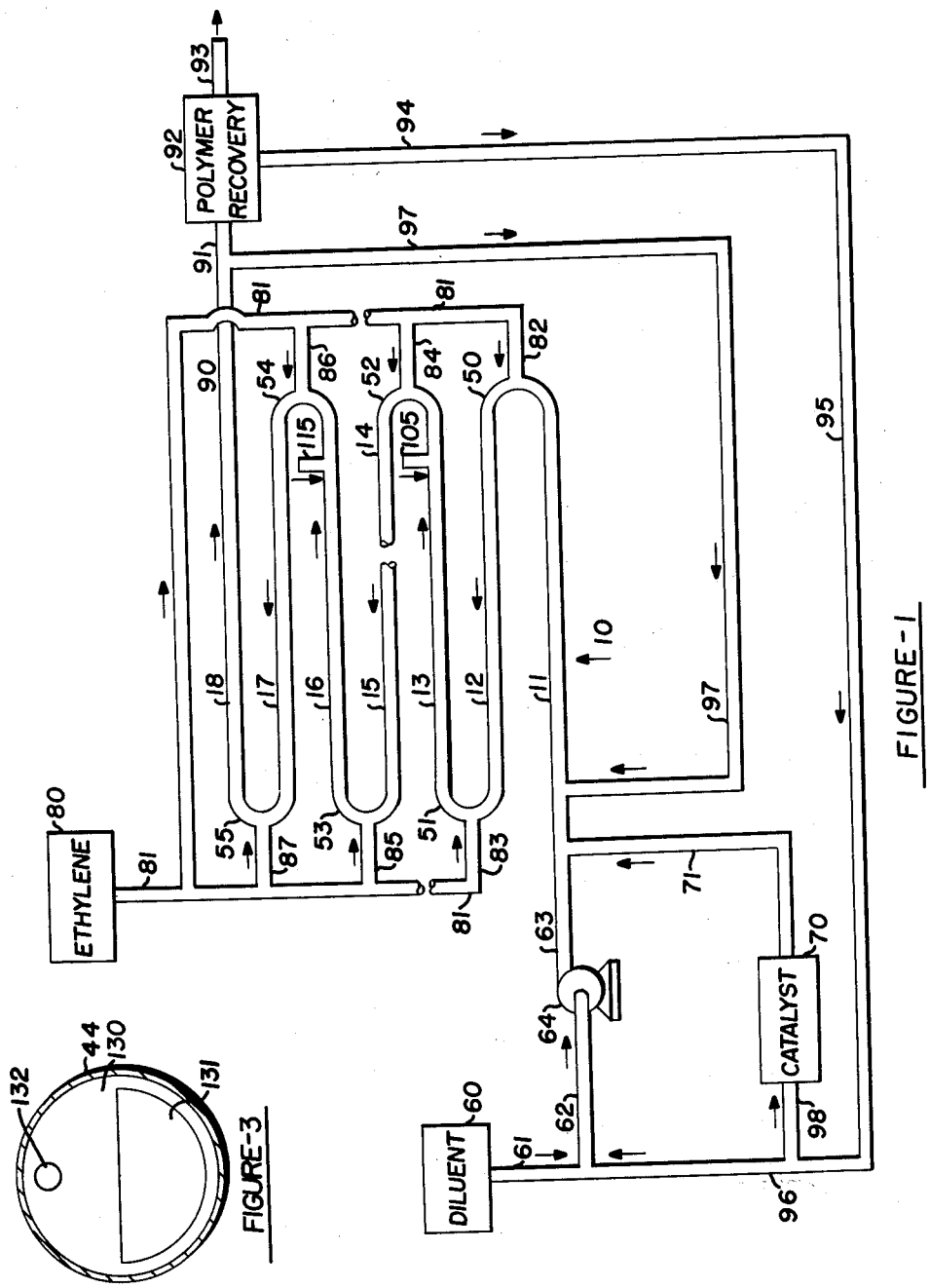

Jan. 15, 1963  J. F. ROSS  3,073,810
METHOD FOR DRYING WET SOLID POLYMERIC MATERIAL
Filed Jan. 23, 1956  2 Sheets-Sheet 1

James F. Ross  Inventor
By E.J. Brenner  Attorney

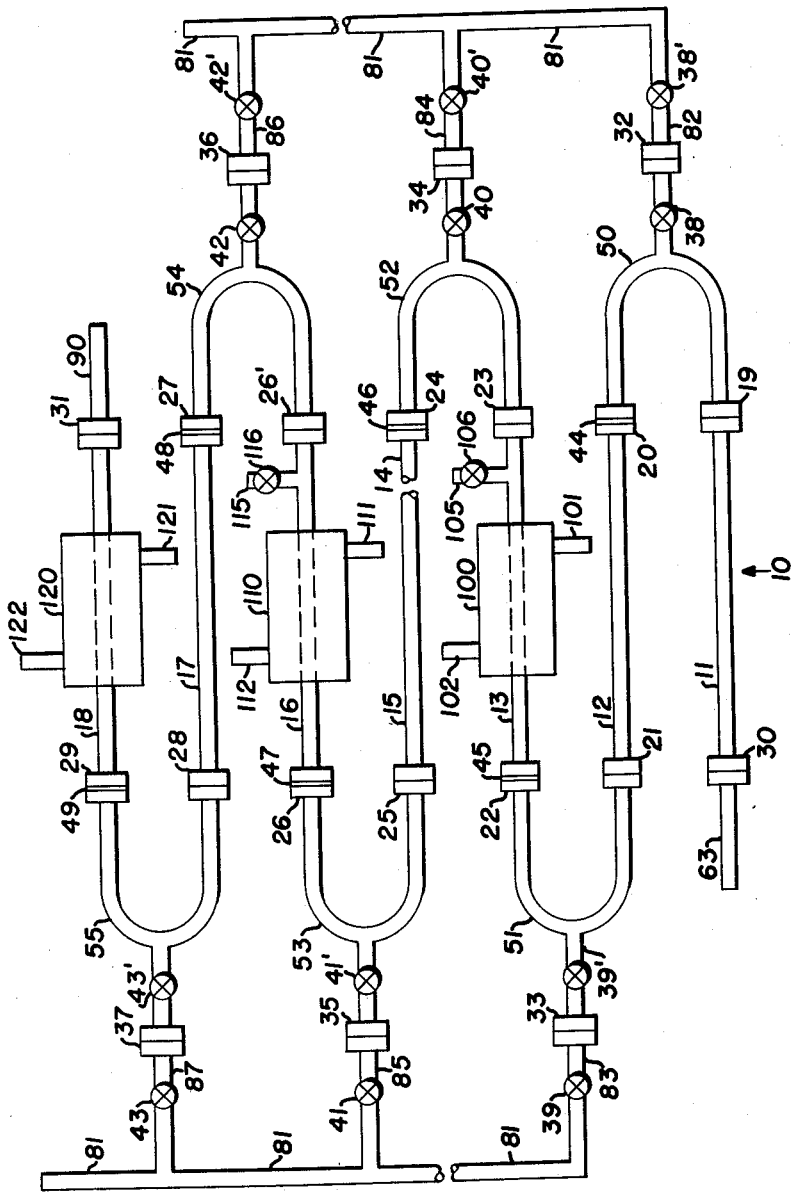
FIGURE-2
James F. Ross  Inventor
By  Attorney

United States Patent Office 3,073,810
Patented Jan. 15, 1963

3,073,810
METHOD FOR DRYING WET SOLID POLYMERIC MATERIAL
James Francis Ross, Baton Rouge, La., assignor to Esso Research and Engineering Company, a corporation of Delaware
Filed Jan. 23, 1956, Ser. No. 560,579
2 Claims. (Cl. 260—93.7)

This invention relates to polymerization and more particularly relates to a novel process and apparatus for continuously polymerizing ethylene or other low molecular weight mono-olefins. The invention also relates to a novel method for drying polymeric materials.

The uses of olefinic hydrocarbon polymers are many and varied. Such polymers are used, for example, in electrical insulation, molded or injected plastics, pipes, self-supporting films for packaging or making laminated sheet materials, etc. In particular, the production of polyethylene at the present time is rapidly increasing as a result of new applications being developed solely for polyethylene and as a result of polyethylene replacing other materials such as wood, steel, copper, aluminum, other plastics, etc. A number of new methods have been developed recently for polymerizing ethylene and other low molecular weight olefinic hydrocarbons. One of these new methods is carried out by polymerizing ethylene or other low molecular weight olefinic hydrocarbons (e.g. propylene) in the presence of a catalyst mixture obtained by mixing a reducing compound, e.g., aluminum trialkyls or dialkyl aluminum halides, with reducible heavy metal compounds, e.g., titanium tetrachloride. See, for instance, Belgian Patent 533,362 of Ziegler. However, the polymerization of olefinic hydrocarbons to date by this Ziegler method has been chiefly carried out in the laboratory and on a batch basis. There is thus an urgent need for a successful continuous process and apparatus for polymerizing ethylene and other low molecular weight olefinic hydrocarbons on a commercial scale.

A novel method and apparatus have now been found for continuously polymerizing ethylene or other low molecular weight hydrocarbon mono-olefins such as propylene. More particularly, the present process comprises continuously introducing to an elongated polymerization zone a stream of inert liquid diluent containing a polymerization catalyst obtained by mixing a reducing metal compound with a reducible heavy metal compound, passing this stream in turbulent flow through the elongated polymerization zone at a superficial velocity sufficient to prevent appreciable back-mixing, and continuously introducing ethylene or other low molecular weight mono-olefin into this stream at a plurality of spaced points along the stream to thereby effect the polymerization of the mono-olefin in the stream by means of the polymerization catalyst. The novel apparatus of the present invention employed for the polymerization of ethylene or other low molecular weight mono-olefin comprises an elongated tubular reactor, means for introducing ethylene or other low molecular weight mono-olefin to the tubular reactor at spaced points therein, this means including flow equalizing orifice restriction elements at each point of introduction of ethylene, mixing means in the tubular reactor disposed therein immediately downstream from each of the flow equalizing elements, and heat exchange means disposed in indirect heat exchange relationship to spaced portions of the tubular reactor. Preferably, the elongated tubular reactor is doubled back over itself in a number of passes in a substantially sinuous conformation to thereby form a relatively compact polymerization reactor. The present process and apparatus are particularly applicable to the polymerization of ethylene, but it will be understood that the present apparatus and method are also applicable to the polymerization of other light hydrocarbon monomers such as propylene, butylene, and the like, as well as to the co-polymerization of such monomers.

The present invention has a number of outstanding advantages. More particularly, the present invention effects a substantially higher polymer yield for a given amount of catalyst than do other proposed continuous processes. This is believed to be due to the relatively high velocities employed in the present polymerization reactor. The turbulent flow results in good mixing of the ethylene and the catalyst but does not result in appreciable back-mixing such that there would be "short-circuiting" of the catalyst through the polymerization zone. "Short-circuiting" of the catalyst in a polymerization reactor would mean that some of the catalyst would leave in a short time and therefore never fully react whereas some of the catalyst would remain in the reactor for such a long period of time that it would be exhausted. Thus the pipeline reactor of the present invention obtains the advantage of a batch system, namely, high polymer yields, while still retaining the simplicity, ease of operation and low cost of a completely continuous system.

A second advantage accruing to the present invention is the elimination of a serious fouling problem. More particularly, the polymerization reactor, as well as heat exchange surfaces, impellers, and the like, generally become fouled with sticky and tacky polymer formed in the polymerization process. This fouling does not appreciably occur in the present invention due to the turbulent flow of the materials through the polymerization reactor. Furthermore, the polymer particles formed in the polymerization reactor have a scouring action on any deposit that may tend to form. In addition, any solid deposit which may tend to form on the walls of the present elongated tubular reactor decreases the available cross-section of the reactor at this point and, therefore, increases the velocity of the stream at that point and hence the kinetic energy of the polymer particles in suspension. This increased kinetic energy serves to increase the scouring efficiency. In one embodiment of the present invention, a portion of the final polymer slurry from the reactor is recycled to the reactor to thereby increase this scouring action.

As stated above, in the preferred embodiment of the present apparatus the elongated tubular reactor is doubled back to form a plurality of straight line passes having a substantially sinuous conformation. These straight line passes are connected by means of detachable U-bends such that the reactor may be readily disassembled. A third advantage of the present reactor is thus the ease with which it may be cleaned during a turn-around. More particularly, the entire reactor can be cleaned thoroughly in a matter of a few hours by the use of standard tube cleaners which are available in every refinery for decoking furnace tubes. The present reactor can therefore be cleaned more quickly and more conveniently than any other type of reactor of comparable size proposed heretofore.

The catalyst employed in the present polymerization process to prepare the polymeric materials of this invention is formed by mixing a compound, generally a metal compound, having reducing properties with a reducible metal compound. More particularly, the metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, the aluminum compounds have the general formula

where R and R' are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. The preferred aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups. Specific examples include aluminum triethyl, diethyl aluminum chloride and diethyl aluminum bromide, as well as mixtures thereof.

The reducible metal compound is one of a metal of groups IV–B, V–B, VI–B and VIII of the periodic system of elements. Examples of such elements include titanium, zirconium, hafnium, thorium, uranium, vanadium, columbium, tantalum, chromium, molybdenum, and tungsten. Examples of the compounds of these metals which may be used include halides such as chlorides or bromides, oxyhalides such as oxychlorides, freshly precipitated oxides or hydroxides, organic compounds such as alcoholates, acetates, benzoates or acetyl acetonates. The preferred salts are those of titanium, zirconium, thorium, uranium and chromium. Titanium salts are particularly preferred such as titanium tetrachloride, titanium oxychloride or titanium acetyl acetonate. Titanium tetrachloride is especially preferred.

The catalyst mixture is prepared simply by mixing the metal compound having reducing properties with the reducible heavy metal compound in the presence of an inert liquid diluent. In general, at least 0.1 mole of the metal compound having reducing properties will be mixed with a mole of the reducible metal compound. Generally the molar ratio of the reducing metal compound to the reducible metal compound is in the range of about 0.2:1 to 10:1, more preferably about 0.7:1 to 2:1. The catalyst mixture is prepared generally using an inert liquid diluent in an amount sufficient to form a mixture containing about 0.2 to 25.0 weight percent, preferably about 0.5 to 2.0 weight percent, of the catalyst components, and employing mixing temperatures in the range of about −20 to 150° F. and mixing times of about 5 minutes to 24 hours. When the two catalyst components are mixed in the presence of an inert liquid diluent, a precipitate is generally formed which is insoluble in the inert liquid diluent.

The ethylene and inert liquid diluent employed in the present process are preferably purified by passage through a bed of alumina gel or through aluminum alkyls, for example. This treatment removes materials such as water, oxygen, acetylene, etc. which would tend to poison the catalyst. The presence, however, of saturated hydrocarbons, such as ethane and methane, for example, do not interfere with the present process. Preferably, the ethylene feed stream contains at least 95% of ethylene.

The inert liquid diluent is employed in the polymerization process to facilitate the polymerization reaction. The amount of the inert liquid diluent employed in the polymerization process will generally be such that the final polymeric product in the reaction mixture does not exceed about 25 weight percent so that a relatively fluid reaction mixture is produced. Usually, the amount of inert diluent is such that the polymeric product in the final reaction mixture is in the range of about 5% to 25% by weight (e.g., 10 weight percent). The proportion of catalyst based on the inert liquid diluent will generally be in the range of about 0.05 to 1.0 weight percent, preferably about 0.1 to 0.5 weight percent. The use of such catalyst concentrations will produce the aforementioned desired final polymer concentrations.

The polymerization reaction conditions, that is, time, temperature and pressure, are adjusted to produce polyethylenes having molecular weights of at least about 2,000, preferably, at least about 10,000. Generally, the polyethylenes will have molecular weights in the range of about 15,000 to 1,000,000. Polymeric products having molecular weights up to 2,000,000 to 5,000,000 or higher may be prepared, however, if desired. The molecular weights referred to herein are number average, and assume the relation of intrinsic viscosity to molecular weight to be that given by Harris, Journal of Polymer Science, 8, 361 (1952). Generally, temperatures in the range of about −40 to 200° C., usually about 25° to 90° C. (e.g., 50° to 60° C.), will be employed. Higher temperatures may be employed if desired, but temperatures above about 250° C. are undesirable generally since the catalyst decomposes to a considerable extent at this temperature. In general, pressures in the range of about 1 to 250 atmospheres or higher may be employed. The process is particularly effective for polymerizing ethylene and this polymerization may be carried out conveniently by employing pressures of about 1 to 50 atmospheres. An advantage of the process is that relatively low pressures may be employed. In order to obtain polymeric products having molecular weights above about 2,000, polymerization reaction or residence times of at least about 15 minutes will be required. Generally, polymerization reaction or residence times in the range of about 0.5 to 4.0 hours, preferably, about 0.5 to 2.0 hours, will be employed.

Upon completion of the polymerization reaction, the polymeric product may be separated from the reaction mixture by conventional techniques such as by filtration, extraction and/or distillation, the polymeric product washed with material such as alcohols and then dried by heating.

The present invention will be better understood by reference to the attached drawings, of which FIG. 1 is a simplified flow plan of the present process; FIG. 2 is a detailed showing of a preferred polymerization reactor of the present invention; and FIG. 3 is a detailed showing of one of the mixing orifices used in the preferred polymerization reactor.

Referring now to FIG. 1, reference character 10 designates a polymerization reactor useful in the present invention. More particularly, it will be noted that reactor 10 comprises a plurality of spaced, substantially parallel passes, namely, passes 11, 12, 13, 14, 15, 16, 17 and 18, which are successively joined one to the other by U-bends 50, 51, 52, 53, 54 and 55 to thereby form the elongated tubular reactor 10 which has a substantially sinuous conformation. The inert liquid diluent useful in the present process is passed from storage tank 60 continuously through lines 61, 62 and 63 into the first pass, namely, pass 11, of reactor 10 by means of pump 64. This inert liquid diluent is preferably a $C_5$ to $C_{10}$ saturated aliphatic hydrocarbon diluent such as hexane, heptane, and the like. It may also be a light, highly-refined mineral oil distillate such as a distillate having a boiling range from about 200° to 600° F., or an aromatic or halogenated hydrocarbon, e.g. benzene, chlorobenzene, etc.

In accordance with the present invention, the catalyst for the present invention (in the form of a suspension in a diluent) is continuously passed from tank 70 through line 71 wherein the catalyst is mixed with the inert liquid diluent flowing through line 63 so that the diluent and catalyst mixture continuously flow together into pass 11 of reactor 10. It will be understood that the catalyst in tank 70 is obtained by mixing a reducing metal compound with a reducible metal compound in the presence of an inert liquid diluent as described heretofore.

Thus, in accordance with the present invention, a stream of inert liquid diluent which contains the afore-described polymerization catalyst is passed continuously into and through reactor 10 flowing successively through passes 11 to 18 and U-bends 50 to 55. This stream of inert liquid diluent and catalyst is passed through reactor 10 in turbulent flow at a superficial velocity sufficient to prevent appreciable back-mixing. Generally the Reynolds number of this stream should exceed about 2,500 and is preferably in the range of about 5,000 to 50,000. Generally, the superficial velocities of this stream will be in the range of about 0.05 to 10, preferably, about 0.5 to 2, feet per second (depending on pipe size). It will be understood that the polymerization reactor may comprise a single straight line pass although it is preferred, for practical considerations, to employ a polymerization reactor which comprises a plurality of passes to thereby have a relatively compact polymerization reactor. Similarly, it will be understood that any number of passes may be employed, such as, for example, 10 passes, 50 passes, 100 passes, etc. The polymerization reactor may also be in the form of a coil, spiral or other compact form.

In accordance with the present invention, ethylene is continuously introduced into the stream flowing through reactor 10 at a plurality of spaced points along the stream. This is accomplished by passing ethylene from storage tank 80 through feeder line 81 from whence the ethylene is passed by means of injection feed lines 82, 83, 84, 85, 86 and 87 into U-bends 50 to 55, respectively. Although this arrangement is preferred, it will be understood that the ethylene may be passed through a lesser or greater number of points than shown in FIG. 1 into the stream flowing through reactor 10. Generally, it will be preferred to introduce the ethylene into the stream at at least about five different points. Preferably, the points are approximately equidistantly spaced and extend from approximately the front end of the polymerization reactor to the back end of the polymerization reactor. Generally, it will be preferred to introduce ethylene into approximately each pass of the polymerization reactor.

The polyethylene formed in polymerization reactor 10 is essentially insoluble in the inert liquid diluent. Thus a resultant slurry stream will be withdrawn from reactor 10 through lines 90 and 91 and passed to polymer recovery zone 92 wherein the polymer is separated from the remainder of the stream, usually by filtration. The polymer separated by filtration may then be washed with a material such as alcohol, e.g., butyl alcohol, and withdrawn from polymer recovery zone 92 through line 93. Preferably, a major proportion of the inert liquid diluent which is separated in polymer recovery zone 92 is recycled through lines 94, 95, 96, 62 and 63 back to polymerization reactor 10. This recycle inert liquid diluent is, of course, continuously mixed with the catalyst (suspended in inert liquid diluent) flowing through line 71. In this case, make-up inert liquid diluent may be passed from tank 60 through line 61 for admixture with the recycle inert liquid diluent from line 96. When a recycle diluent stream is employed, a portion of this stream may be passed through line 98 to be employed in the catalyst preparation tank 70, the remainder being passed through lines 96, 62 and 63 for admixture with the catalyst suspension flowing through line 71.

In one embodiment of the present invention, a minor amount of the polymer slurry (e.g., 1 to 20 weight percent) flowing from reactor 10 through line 90 is recycled to the polymerization process by means of line 97. This recycle slurry stream is employed to aid in scouring the interior surfaces of elongated tubular reactor 10 to thereby prevent any serious build-up of polymer film thereon.

Additional reducing metal compound may be added to the reaction mixture stream flowing through tubular reactor 10, if desired. More specifically, tubular reactor 10 may be provided at spaced points with one or more feed lines, such as feed line 105 to pass 13 and feed line 115 to pass 16 whereby reducing compounds of aluminum may be fed into the reaction mixture. Generally, the amount of incremental reducing compound added in this manner will be about 0.1:1 to 2:1, preferably 0.1:1 to 1:1, moles of incremental reducing compound per mole of reducible compound initially introduced to the process. This incremental addition of the reducing metal compound has the advantage of increasing the effectiveness (or activity) of the polymerization catalyst in the present process.

Reference is now made to FIG. 2, which shows in greater detail the construction of polymerization reactor 10. More particularly, it will be noted that reactor 10 comprises a plurality of spaced, substantially parallel passes 11, 12, 13, 14, 15, 16, 17 and 18 which may be constructed of standard pipes composed of cast iron, steel, or the like. These passes are consecutively connected one to the other by means of U-bends 50, 51, 52, 53, 54 and 55 by means of flanges 19, 20, 21, 22, 23, 24, 25, 26, 26', 27, 28 and 29. The first pass of reactor 10, namely, pass 11, is connected to line 63 by means of flange 30 and the back end of pass 18 is connected to line 90 by means of flange 31. These flanged connections are detachable, being held together by any suitable connection means (such as nuts and bolts) during the operation of reactor 10. When it is desired to clean reactor 10, these flanged connections are disassembled so that the passes may be readily cleaned by means of standard tube cleaners. Generally, the passes and U-bends will be constructed of standard pipe having a nominal size from about 2 to 12 inches, preferably about 3 to 6 inches.

Preferably, each of ethylene injection feed lines 82 to 87 is provided with a flow-equalizing orifice restriction element. More particularly, ethylene feed lines 82 to 87 are provided, respectively, with orifices 32, 33, 34, 35, 36 and 37. More particularly, these flow control orifices are standard flow control or limiting sharp edge orifices so sized as to cause the desired (e.g. equal) flow through each of the feed lines 82 to 87. These orifices should cause a pressure drop of, say, 5 p.s.i. at the usual ethylene rate. For example, for a flow of ethylene at 50 p.s.i. and 100° F. of 12.8#/hr./feed line, 0.10" orifices would be used. Preferably, a pair of valves is arranged in each ethylene injection feed line, one of the valves being on the upstream side of the orifices and the other valve of the pair being on the downstream side of the orifice. More specifically, in FIG. 2, feed lines 82 to 87 are provided, respectively, with valve pairs 38 and 38', 39 and 39', 40 and 40', 41, 41', 42, 42', 43 and 43'. These valves are provided primarily to permit changing orifices (in case of plugging, etc.) while the reactor is being employed for polymerization. If desired, they may also be employed to regulate the flow of ethylene. If desired, each of these ethylene feed lines may be provided with conventional flow control apparatus to thereby automatically control the flow of ethylene into each pass.

Reactor 10 is also provided with feed lines 105 and 115 for the purpose of introducing incremental reducing metal compounds thereto. Feed line 105 communicates with pass 13 and the rate of addition of the reducing metal compound is controlled by valve 106; feed line 115 communicates with pass 16 and the rate of addition of the reducing metal compound is controlled by valve 106. It will be understood that additional reducing metal feed lines may be employed if desired, e.g. one feed line for every one or two parallel passes.

In a preferred embodiment of the present invention, mixing orifices 44, 45, 46, 47, 48 and 49 are arranged within flange connections 20, 22, 24, 26, 27 and 29, respectively, to thereby increase the mixing efficiency of the present reactor. More particularly, these mixing orifices are preferably segmental or eccentric standard sharp edge orifices. These orifices should have a flow area about 10 to 80% of the pipe flow area, preferably about 30–50%. These orifices should be so oriented that the opening would be on the bottom of the pipe, so that polymer would not tend to back up behind the orifices. These orifices can, if desired, by equipped with small bleed holes near or at the top so as to permit gas to pass through the orifice plate.

A detailed drawing of mixing orifice 44 is shown in FIG. 3. It will be seen that orifice 44 comprises a circular plate or disc 130 which is provided with a segmented orifice opening 131 in the lower portion thereof and with a small bleed hole 132 in the upper portion thereof. In the operation of polymerization reactor 10, the polymerization stream flows through opening 131, and in so doing is thoroughly mixed, and ethylene gas may flow through bleed hole 132. It will be understood that more than one bleed hole may be provided in the upper portion of disc 130.

In addition, it is preferred that reactor 10 be equipped with indirect heat exchangers such as heat exchangers 100, 110 and 120 arranged, respectively, about passes 13, 16 and 18. It will be understood that a lesser or greater number of heat exchangers may be employed in conjunction with reactor 10 if desired. Since the present polymerization reaction is exothermic, it will generally be desired to circulate a coolant, such as water, in indirect heat exchange with the polymerization reaction stream. This may be accomplished by means of inlet line 101 and exit line 102 in heat exchanger 100, inlet line 111 and outlet line 112 in heat exchanger 110 and inlet line 121 and outlet line 122 in heat exchanger 120. These inlet and outlet lines are employed to pass the coolant, such as water, through the heat exchangers. Preferably, the heat exchangers are so spaced that, at the inlet to an exchanger section, the main polymerization stream is, say, about 5° to 10° C. above the desired average temperature. In the exchanger, the stream is then cooled to, say, about 5 to 10° C. below the desired average temperature. The polymerization stream leaving the heat exchanger would then gradually rise in temperature for about 10° to 20° C., at which point the stream would then enter another heat exchanger.

The polymers or copolymers produced by the method of this invention may be dried by conventional methods such as heating in driers or ovens. However, in accordance with the present invention, the drying is carried out in a novel manner which comprises aerating the wet polymer with a stream of hot gas whereby the polymer is dried and in so doing de-agglomerates into discrete particles. These dry particles may then be entrained into the stream of hot gas. The entrained dry polymer is then separated from the gas stream by means of cyclone separators (or equivalent means) and the powdery polymer may then be passed to conventional packaging equipment.

As an alternative, the polymer may be maintained in a fluidized state in the form of a fluidized bed. Wet polymer may be continuously fed into this bed and dry polymer continuously withdrawn from the fluidized bed. The polymer is maintained in the form of a fluidized bed by passage therethrough of the hot gas.

Generally, the temperature of the gas should be sufficiently high to insure drying but low enough to prevent thermal degradation. For example, gas temperatures of about 100° to 300° F., preferably, about 180° to 200° F. may be employed. Preferably, the hot gas is inert, e.g. nitrogen, flue gas, etc. The velocity of the gas is selected to carry out the desired process. Higher gas velocities will be generally necessary to obtain polymer entrainment (dry polymer only) than will be required to maintain a fluidized bed. The present drying process is superior to conventional drying techniques since it produces a uniform and dry polymer in a short period of time. Furthermore, the present drying process is readily adaptable to a continuous operation. It will be understood that the present drying technique may be applied generally to the drying of polymeric materials including those produced by other types of polymerization processes.

A specific embodiment of the present process and apparatus will now be described. In this specific embodiment, 500 pounds per hour of polyethylene are produced in the form of a slurry containing 10 weight percent polymer in diluent. Reactor 10 comprises 40 passes, each about 100 feet long. Each of these passes in constructed of 3″ NPS (3.068″ I.D.) standard weight pipe. Between each pass is a 3″ NPS standard weight return bend affixed to the straight sections by 150-pound flanges. Approximately 12.8 pounds per hour of ethylene are continuously introduced through each ethylene feed line of which there are 39 in number. These ethylene injection feed lines connect into the return bends connecting successive passes. Each ethylene feed line is provided with a standard sharp edge concentric orifice, 0.10″ in diameter, as the flow-equalizing orifice element. A mixing orifice is placed in each flange immediately downstream from each ethylene injection feed line. These mixing orifices are segmental, having a free area of 50% of the pipe diameter, opening at the bottom with a ¼″ bleed hole at the top of the orifice plate. These orifices are placed, as shown in FIG. 2, in the center of flanges 20, 22, 24, 26, 27 and 29.

Approximately 1.9 pounds per hour of aluminum diethyl chloride are admixed with 3.1 pounds per hour of titanium tetrachloride in the catalyst preparation zone in the presence of about 30 gallons per hour of inert liquid diluent, which in this case is a highly refined mineral oil of 50° API gravity and having a boiling range of about 400° to 500° F. The resultant catalyst suspension is then passed through line 71 wherein it is admixed with about 700 gallons per hour of additional inert liquid diluent to give a catalyst concentration in the inert liquid diluent of about 0.1 weight percent. This catalyst-diluent stream is then passed through reactor 10 at a superficial velocity of about 0.54 feet per second, which corresponds to a Reynolds number of approximately 5,000. The pressure in reactor 10 is maintained at about 25 p.s.i.g. and the average temperature therein is maintained at about 150° F. Indirect heat exchangers are provided at every sixth pass, each of the indirect heat exchangers having a capacity of about 66,000 B.t.u. per hour. The residence time of the material in reactor 10 is about 2 hours. The resultant polymer slurry is passed from reactor 10 through lines 90 to 91 wherein approximately 500 pounds per hour of polyethylene are separated by filtration from the reaction mixture and removed from the polymer recovery zone through line 93.

In the embodiment of the present invention wherein inert liquid diluent is recycled, approximately 700 gallons per hour of inert liquid diluent are recycled to the process through lines 94, 95 and 96. Approximately 30 gallons per hour of this recycle diluent are passed through line 98 for preparation of the catalyst and the remainder is passed through lines 96 and 62 for admixture with the catalyst suspension. Approximately 35 gallons per hour of fresh make-up inert liquid diluent are passed from tank 60 through lines 61, 62 and 63 for admixture with recycle diluent and catalyst suspension. In the embodiment of the invention wherein it is desired to recycle a portion of the polymer slurry, approximately 10 weight percent of the polymer slurry flowing through line 90 is passed through line 97 back to reactor 10.

What is claimed is:

1. An improved method for drying agglomerated wet solid polymeric material obtained by Ziegler polymerization of a $C_2$-$C_4$ mono-olefin which comprises mechanically separating said wet polymeric material from an organic slurry, passing a stream of hot gas through said wet polymeric material at a rate sufficient to de-agglomerate said agglomerated polymeric material and to maintain the resultant dry polymeric material in the form of a fluidized bed, introducing wet polymeric material to said bed and withdrawing dry polymeric material from said bed.

2. An improved method for drying agglomerated wet solid polymeric material, obtained by Ziegler polymerization of a $C_2$–$C_4$ mono-olefin, including the steps of mechanically separating said wet polymeric material from an organic slurry, passing a stream of hot inert gas at a temperature of 100° to 300° F. through said wet polymeric material at a rate sufficient to de-agglomerate said agglomerated polymeric material, passing a stream of hot inert gas at a temperature of 100° to 300° F. through said de-agglomerated polymeric material to maintain it in a fluidized bed, introducing wet polymeric material to the de-agglomeration step, and withdrawing dry polymeric material from said bed.

References Cited in the file of this patent

UNITED STATES PATENTS

| | | |
|---|---|---|
| 2,510,372 | Bloxham | Jan. 6, 1950 |
| 2,692,261 | Peters et al. | Oct. 19, 1954 |
| 2,721,189 | Anderson et al. | Oct. 18, 1955 |
| 2,832,759 | Nowlin et al. | Apr. 29, 1958 |
| 2,833,755 | Coover | May 6, 1958 |
| 2,838,477 | Roelen et al. | June 10, 1958 |
| 2,862,917 | Anderson et al. | Dec. 2, 1958 |
| 2,889,314 | Fritz | June 2, 1959 |

FOREIGN PATENTS

| | | |
|---|---|---|
| 533,362 | Belgium | May 16, 1955 |

OTHER REFERENCES

Chemical Engineers Handbook (Perry), published by McGraw-Hill (New York), 1950, pages 817, 1203.